US012580796B2

(12) United States Patent
Chung et al.

(10) Patent No.: US 12,580,796 B2
(45) Date of Patent: Mar. 17, 2026

(54) DECISION-FEEDBACK EQUALIZER SLICERS FOR PULSE AMPLITUDE MODULATION SIGNALING

(71) Applicant: QUALCOMM Incorporated, San Diego, CA (US)

(72) Inventors: Younwoong Chung, San Diego, CA (US); Yu Song, San Diego, CA (US); Chia Heng Chang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 129 days.

(21) Appl. No.: 18/582,161

(22) Filed: Feb. 20, 2024

(65) Prior Publication Data

US 2025/0267046 A1      Aug. 21, 2025

(51) Int. Cl.
*H04L 25/03* (2006.01)
(52) U.S. Cl.
CPC ............................... *H04L 25/03057* (2013.01)
(58) Field of Classification Search
CPC ............. H04L 25/0272; H04L 25/0294; H04L 25/03006; H04L 25/03019; H04L 25/03057; H04L 25/03076; H04L 25/03108; H04L 25/03146; H04L 25/03267
USPC .......... 375/232, 233, 348–350; 708/322, 323
See application file for complete search history.

(56) References Cited

U.S. PATENT DOCUMENTS

| | | | | |
|---|---|---|---|---|
| 10,848,353 B1 * | 11/2020 | Dong | ................ | H04L 25/03057 |
| 10,892,918 B1 * | 1/2021 | Eachempatti | ....... | H04L 25/4917 |
| 11,646,917 B1 * | 5/2023 | Chung | .................. | H04L 7/0079 375/233 |
| 2005/0271135 A1 * | 12/2005 | Shida | .................... | H04L 25/061 375/232 |
| 2013/0094561 A1 | 4/2013 | Raphaeli et al. | | |

(Continued)

OTHER PUBLICATIONS

Dickson T.O., et al., "A 12-Gb/s 11-mW Half-rate Sampled 5-Tap Decision Feedback Equalizer with Current-integration Summers in 45-nm SOI CMOS Technology", VLSI Circuits, 2008 IEEE Symposium on, IEEE, Piscataway, NJ, USA, Jun. 18, 2008, pp. 58-59, XP031295801, figure 2 p. 1, right-hand column.

(Continued)

*Primary Examiner* — Young T. Tse
(74) *Attorney, Agent, or Firm* — Loza & Loza, LLP

(57) ABSTRACT

An interface circuit includes a current summer, a pair of slicers and a pair of replica summing circuits. The current summer is configured to sum currents representative of a signaling state of an input signal in a sequence of transmission intervals. A first slicer is configured to generate a first decision based on a comparison of an output of the current summer and voltage level of a first threshold signal. A second slicer is configured to generate a second decision based on a comparison of the output of the current summer and voltage level of a second threshold signal. A first replica summing circuit is configured to generate the first threshold signal based on a common-mode signal that is representative of the common-mode voltage at the input of the current summer. A second replica summing circuit is configured to generate the second threshold signal based on the common mode signal.

20 Claims, 11 Drawing Sheets

(56) References Cited

U.S. PATENT DOCUMENTS

| | | | |
|---|---|---|---|
| 2013/0308694 A1* | 11/2013 | Amamiya ............... | H04B 7/005 |
| | | | 375/233 |
| 2014/0177697 A1* | 6/2014 | Nguyen ............ | H04L 25/03057 |
| | | | 375/233 |
| 2022/0376958 A1* | 11/2022 | Kang .................. | H04L 25/4917 |
| 2025/0125999 A1* | 4/2025 | Valaee .............. | H04L 25/03878 |

OTHER PUBLICATIONS

International Search Report and Written Opinion—PCT/US2025/013705—ISA/EPO—May 8, 2025.

Park M., et al., "ISSCC 2007 / Session 12 / GIGABIT CDRs and Equalizers / 12.5 12.5 A 7Gb/s 9.3mW 2-Tap Current-Integrating DFE Receiver", Feb. 11, 2007, pp. 230-231, XP093272996, 3 Pages, figures 12.5.1, 12.5.2 p. 1, left-hand column.

Park H., et al., "A 56-GB/s PAM-4 Receiver Using Time-Based LSB Decoder and S/H Technique for Robustness to Comparator Voltage Variations", IEEE Journal of Solid-state Circuits, vol. 57, No. 2, Feb. 2022, pp. 562-572.

Peng P-J., et al., "A 56Gb/s PAM-4/NRZ Transceiver in 40nm CMOS", ISSCC 2017 / Session 6 / Ultra-High-Speed Wireline / 6.1, Feb. 6, 2017, 3 Pages.

\* cited by examiner

100

102 Central Processing Unit (CPU)

104 Modem Processor

106 Graphics Processor (GPU)

108 Application Processor

122 Interconnection/Bus Module

112 USB Controller

114 Memory Controller

116 Centralized Resource Manager (CRM)

110 System Components and Resources

126 Memory Interface/Bus

124 Memory

700

Slicing Circuit

720

DECISION-FEEDBACK EQUALIZER SLICERS FOR PULSE AMPLITUDE MODULATION SIGNALING

TECHNICAL FIELD

The present disclosure generally relates to high-speed data communication interfaces that use serializers and/or deserializers and, more particularly, to providing reference signals used by slicers in a receiver.

BACKGROUND

Electronic device technologies have seen explosive growth over the past several years. For example, growth of cellular and wireless communication technologies has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. Wireless devices may include a high speed bus interface for communication of signals between hardware components. For example, the high-speed bus interface may be implemented using a Peripheral Component Interconnect Express (PCIe) bus. High frequency signals may be equalized at a receiver. The receiver may utilize a combination of summing and sampling circuits when processing received signals. The performance of these circuits can be adversely affected by changes or variations in the common-mode voltage associated with the received signals. There is an ongoing need for improved circuits that are used to equalize, amplify or otherwise process signals received via the bus interface.

SUMMARY

Certain aspects of the disclosure relate to systems, apparatus, methods and techniques for dynamically controlling reference voltages in a high-frequency interface that includes a serializer/deserializer (SerDes). The interface may be configured to receive signals that have been encoded using pulse amplitude modulation. Dynamically controlling reference voltages can facilitate or enable reliable operation notwithstanding changes in process parameters, voltage and/or temperature.

In various aspects of the disclosure, an interface circuit in a receiving device includes a current summer configured to sum a current representative of a signaling state of an input signal in a present transmission interval with currents representative of signaling states of the input signal captured in previous transmission intervals, a first slicer configured to generate a first decision based on a comparison of an output of the current summer and voltage level of a first threshold signal, a second slicer configured to generate a second decision based on a comparison of the output of the current summer and voltage level of a second threshold signal, a first replica summing circuit configured to generate the first threshold signal based on a common-mode signal that is representative of the common-mode voltage at the input of the current summer, and a second replica summing circuit configured to generate the second threshold signal based on the common-mode signal.

In various aspects of the disclosure, a reference voltage generator includes first and second replica summing circuits that are at least partial replicas of a current summer. The first replica summing circuit may be configured to output a first threshold signal based on a common-mode voltage at an input of the current summer. The second replica may be configured to output a second threshold signal based on the common-mode voltage at the input of the current summer. The first threshold signal may be provided to a first slicer that is configured to generate a first decision regarding signaling state of an input signal received by the summer based on voltage level of the first threshold signal. The second threshold signal may be provided to a second slicer that is configured to generate a second decision regarding signaling state of an input signal received by the summer based on voltage level of the second threshold signal.

In various aspects of the disclosure, an apparatus includes means for summing currents representative of a sequence of signaling states of an input signal and to obtain a summer output signal, means for generating decisions related to the summer output signal, and means for generating threshold signals. The means for generating decisions related to the summer output signal may include a first slicer configured to generate a first decision based on a comparison of a summer output signal and voltage level of a first threshold signal, and a second slicer configured to generate a second decision based on a comparison of the summer output signal and voltage level of a second threshold signal. The means for generating threshold signals may generate the first threshold signal and the second threshold signal based on a common-mode signal that is representative of the common-mode voltage at the input of the current summer.

In various aspects of the disclosure, a method for receiving encoded signals includes summing a current representative of a signaling state of an input signal in a present transmission interval with currents representative of signaling states of the input signal captured in previous transmission intervals to obtain a summer output signal, generating a first decision based on a comparison of the summer output signal and a voltage level of a first threshold signal, generating a second decision based on a comparison of the summer output signal and a voltage level of a second threshold signal, generating the first threshold signal based on a common-mode signal that is representative of the common-mode voltage of the input signal, and generating the second threshold signal based on the common-mode signal.

In certain aspects, the input signal is a pulse amplitude modulation (PAM) signal. The first threshold signal may have a voltage that lies within a first range of voltages bounded by a first pair of signaling levels associated with the PAM signal. The second threshold signal may have a voltage that lies within a second range of voltages bounded by a second pair of signaling levels associated with the PAM signal. In some instances, at least one signaling level in the first pair of signaling levels is different from both signaling levels in the second pair of signaling levels.

In one aspect, the first threshold signal has a voltage level that is defined by an integral of the current flow over a period of time. The second threshold signal may have a voltage level that is defined by an integral of the current flow over a period of time.

In certain aspects, the current summer is configured to sum currents provided by a plurality of current sources. The plurality of current sources may include a first current representative of a signaling state of an input signal in a first transmission interval and one or more weighted currents representative of signaling states of the input signal captured in corresponding transmission intervals that precede the first transmission interval. The currents representative of signaling states of the input signal captured in previous transmission intervals are weighted using decision-feedback equalizer taps. Weights used to provide the weighted currents may be configured for a decision-feedback equalizer (DFE). The first replica summing circuit and the first replica summing circuit may be configured to sum unweighted currents.

DETAILED DESCRIPTION

Figure 1:
FIG. 1 illustrates an example of a system-on-a-chip (SOC) in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

The terms "computing device" and "mobile device" are used interchangeably herein to refer to any one or all of servers, personal computers, smartphones, cellular telephones, tablet computers, laptop computers, netbooks, ultrabooks, palm-top computers, personal data assistants (PDAs), wireless electronic mail receivers, multimedia Internet-enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, size, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors (DSPs), modem processors, video processors, etc.), memory blocks (e.g., read only memory (ROM), random access memory (RAM), flash, etc.), and resources (e.g., timers, voltage regulators, oscillators, etc.), any or all of which may be included in one or more cores.

Memory technologies described herein may be suitable for storing instructions, programs, control signals, and/or data for use in or by a computer or other digital electronic device. Any references to terminology and/or technical details related to an individual type of memory, interface, standard, or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.).

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs.

Certain aspects of the disclosure are applicable to circuits that generate, transmit, receive, process and/or propagate differential signals. A wire pair comprises two wires, connectors, interconnects or other conductors over which a differential signal is transmitted. The differential signal is carried in two phase versions over the wire pair, whereby the wires, connectors, interconnects or other conductors in the wire pair carry versions of the differential signal that are phase-shifted from each other by 180°. The versions of the differential signal transmitted over the wire pair may be referred to as complementary signals. The differential signal is transmitted over wires, connectors, interconnects or other conductors using voltages of equal voltage magnitude and opposite polarity. A received signal that represents the difference between the signaling state of the wire pair can be generated at a receiving device. An identical direct current (DC) offset from system ground carried by each wire of the pair may be referred to as a common-mode voltage. The common-mode voltage may be measured at the input terminals of a receiving device. An identical signal carried in-phase by each wire of the pair may be referred to as a common-mode signal. Common-mode noise affecting wires, connectors, interconnects or other conductors can be expected to induce a near-identical interference signal in the wire pair. The interference signal is typically cancelled by subtraction at the receiver and does not affect the received signal.

Certain aspects of this disclosure relate to receiver circuits used in interfaces that include high-speed serializer-deserializer (SerDes) circuits. Certain receiver circuits are described that can be deployed in the analog front-end (AFE) of a receiver. In one aspect, techniques and circuits that can be used for receiving signals encoded using pulse amplitude modulation are disclosed. These techniques and circuits may relate to components of an AFE gain stage, which may include equalizers such as a decision-feedback equalizer (DFE), a variable-gain amplifier (VGA), buffers, summers, and so on. In one example, some aspects of the disclosure relate to a circuit that includes a summer and a sampler.

FIG. 1 illustrates example components and interconnections in a system-on-chip (SoC) 100 that may be suitable for implementing certain aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that the processors may operate at a much higher frequency/clock rate than would be possible if the signals were to travel off-chip. The proximity of the cores may also allow for the sharing of on-chip memory and resources (e.g., voltage rails), as well as for more coordinated cooperation between cores.

The SoC 100 may include system components and resources 110 for managing sensor data, analog-to-digital conversions, and/or wireless data transmissions, and for performing other specialized operations (e.g., decoding high-definition video, video processing, etc.). System components and resources 110 may also include components such as voltage regulators, oscillators, phase-locked loops (PLLs), peripheral bridges, data controllers, system controllers, access ports, timers, and/or other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a Universal Serial Bus (USB) or other serial bus controller 112, one or more memory controllers 114, and a centralized resource manager (CRM) 116. The SoC 100 may also include an input/output module (not illustrated) for communicating with resources external to the SoC, each of which may be shared by two or more of the internal SoC components.

The processors 102, 104, 106, 108 may be interconnected to the USB controller 112, the memory controller 114, system components and resources 110, CRM 116, and/or other system components via an interconnection/bus module 122, which may include an array of reconfigurable logic gates and/or implement a bus architecture. Communications may also be provided by advanced interconnects, such as high performance networks on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the interconnection/bus module 122 may implement an arbitration scheme to prevent multiple master components from attempting to drive the bus simultaneously. The memory controller 114 may be a specialized hardware module configured to manage the flow of data to and from a memory 124 via a memory interface/bus 126.

The memory controller 114 may comprise one or more processors configured to perform read and write operations with the memory 124. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In certain aspects, the memory 124 may be part of the SoC 100.

Figure 2:
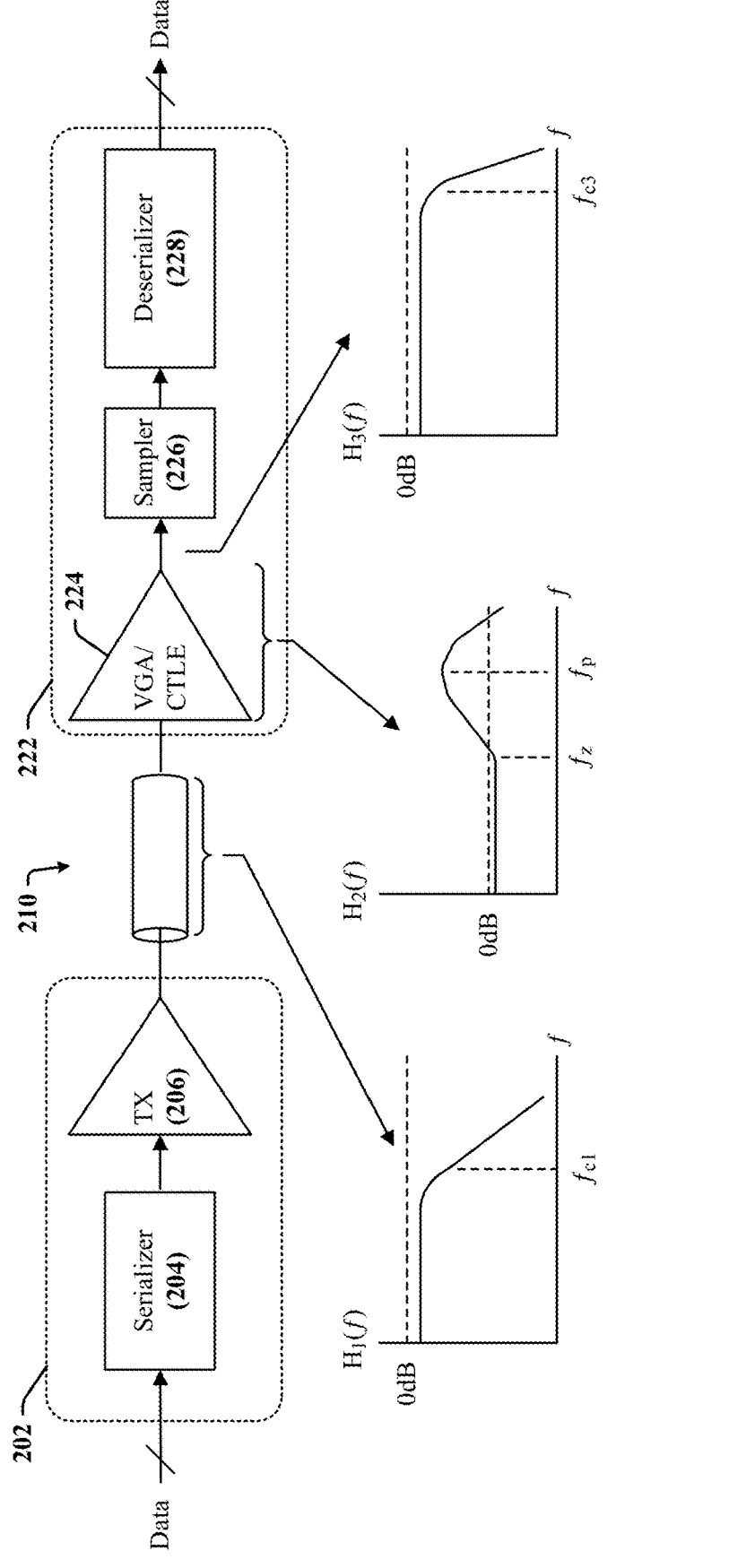
FIG. 2 illustrates an example of a data communication system that may be adapted in accordance with certain aspects of the present disclosure.

FIG. 2 illustrates an example of a data communication system 200 that may be adapted in accordance with certain aspects of the present disclosure. The data communication system 200 includes a transmitter 202, a data communication channel 210, and a receiver 222. The transmitter 202 may be provided in a first device that is configured to transmit a data signal to a second device. The data communication channel 210 provides a transmission medium through which the data signal propagates from the first device to the second device. The receiver 222 may be provided in the second device and may be configured to receive and process the data signal.

In one example, the transmitter 202 includes a serializer 204 configured to convert parallel data into serial data. The transmitter 202 further includes a transmit driver 206 configured to generate a data signal based on the serial data for transmission to the receiver 222 through the data communication channel 210.

The data communication channel 210 may be implemented using any type of transmission medium by which a data signal can propagate from the transmitter 202 to the receiver 222. Examples of the data communication channel 210 includes one or more metallization traces (which may include one or more vias) on a printed circuit board (PCB), stripline, microstrip, coaxial cable, twisted pair, etc.

In the illustrated example, the receiver 222 includes a VGA with a continuous time linear equalizer (CTLE), a clock data recovery circuit (the CDR 226) and a deserializer 228. The combination of the VGA and CTLE is referenced herein as the VGA/CTLE 224. CTLE may refer to techniques for boosting the higher frequency components of the signal at the receiver in order to bring all frequency components of the signal to a similar amplitude ratio before channel attenuation, improving jitter and eye-diagram performance. As disclosed herein, the VGA/CTLE 224 is configured to perform equalization and amplification of the received data signal. The CDR 226 is configured to recover a clock associated with the data signal and use the clock to recover the serial data from the data signal. The deserializer 228 is configured to convert the serial data back into parallel data.

The data communication channel 210 typically has a frequency response $H_1(f)$ that is similar to a low pass filter. For instance, the frequency response $H_1(f)$ has relatively low losses from direct current (DC) up to a particularly cutoff frequency $f_{c1}$; then the losses increase monotonically above the cutoff frequency $f_{c1}$. The frequency response $H_1(f)$ of the data communication channel 210 limits the data rate at which data may be sent through the channel. For example, the cutoff frequency $f_{c1}$ should be at least to the Nyquist rate of the data signal. If the Nyquist rate of the data signal is above the cutoff frequency $f_{c1}$, the data signal exhibits distortion at the receiver 222, which may be characterized as the eye in a signal eye diagram closing or getting smaller, making it difficult to recover the clock and the data by the CDR 226.

The VGA/CTLE 224 may perform equalization and amplification to increase the high frequency components of the data signal in order to increase the data rate at which the data signal may be sent through the data communication cable and reliably recovered at the receiver 222. For example, the VGA/CTLE 224 may be configured to provide a frequency response $H_2(f)$ that is substantially flat from DC up to a frequency $f_z$ corresponding to a Zero. Then, above the zero frequency $f_z$, the frequency response $H_2(f)$ of the VGA/CTLE 224 increases up to a frequency $f_p$ corresponding to a pole. Above the pole frequency $f_p$, the frequency response $H_2(f)$ of the VGA/CTLE 224 decreases monotonically. In some examples, the VGA/CTLE 224 may have more than one pole and one zero.

The VGA/CTLE 224 may be configured to have a frequency response $H_2(f)$ where the pole frequency $f_p$ substantially coincides with the cutoff frequency $f_{c1}$ of the frequency response $H_1(f)$ of the data communication channel 210. As the data communication channel 210 is cascaded with the VGA/CTLE 224, the frequency responses $H_1(f)$ and $H_2(f)$ of the data communication channel 210 and the VGA/CTLE 224 combine at the output of the VGA/CTLE 224 to form a composite frequency response $H_3(f)$. Thus, the high frequency boost at the pole frequency $f_p$ of the VGA/CTLE frequency response $H_2(f)$ compensates for the loss roll off at the cutoff frequency $f_{c1}$ of the channel frequency response $H_1(f)$ to generate the composite frequency response $H_3(f)$ having a cutoff frequency $f_{c3}$ much higher than the cutoff frequency $f_{c1}$ of the channel frequency response $H_1(f)$. Thus, through the use of the VGA/CTLE 224, much higher data rates between the transmitter 202 and receiver 222 may be realized.

Figure 3:
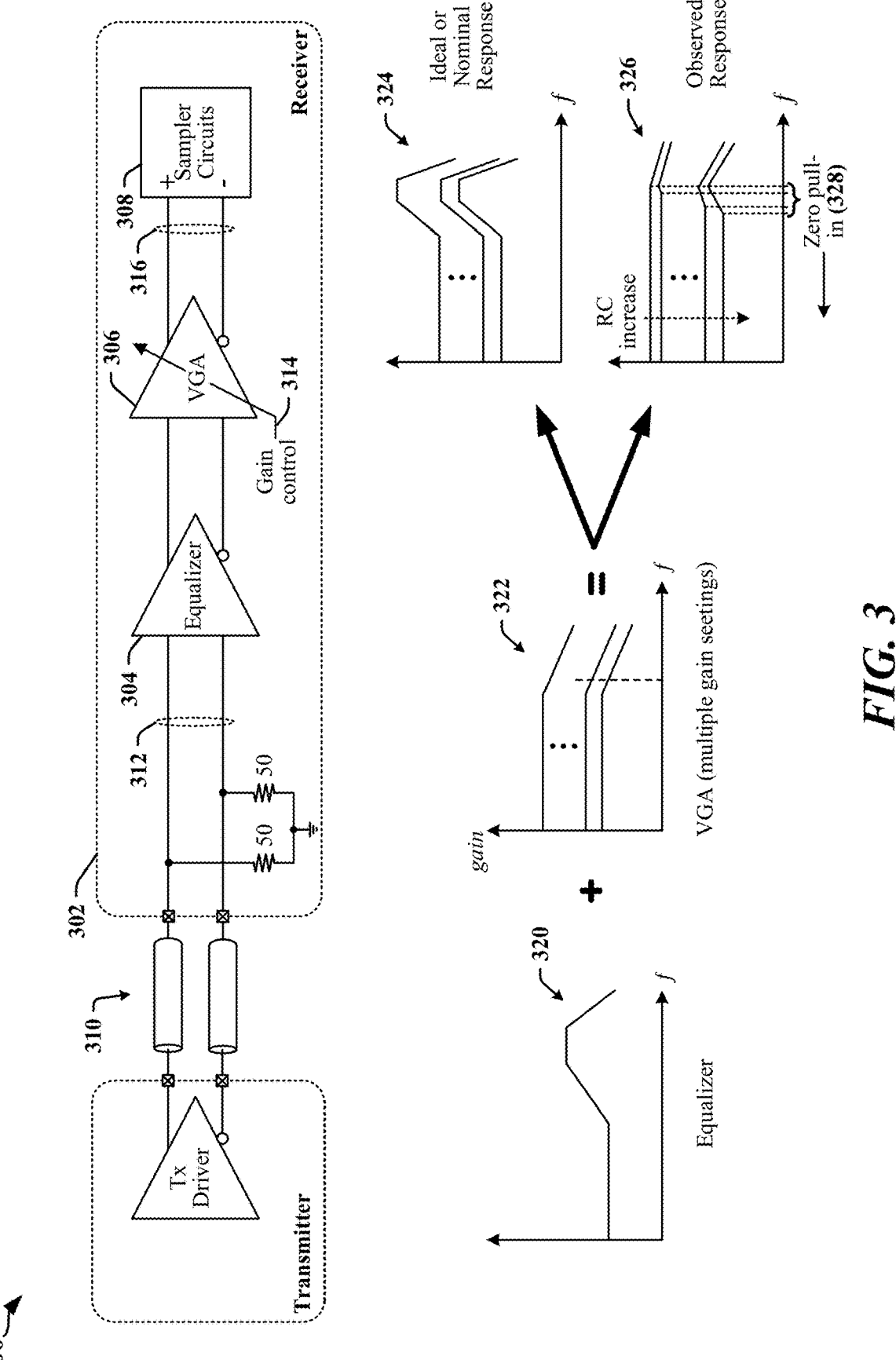
FIG. 3 illustrates certain aspects of the operation of a data communication interface that may be implemented in an SoC or in another IC device.

FIG. 3 illustrates certain effects of manufacturing process, voltage and/or temperature (PVT) variations affect the operation of transistors and other components in a data communication interface 300. The illustrated data communication interface 300 may be implemented in an SoC or in another IC device. The receiver 302 in the data communication interface 300 includes differential signal processing circuits, including an equalizer 304 and a variable gain amplifier (the VGA 306). The differential signal processing circuits can be configured to generate a differential output signal 316 by applying a frequency-dependent gain to a differential input signal 312, which is received from a differential communication channel 310 in the illustrated example. The differential output signal 316 may be provided to sampler circuits 308 configured to extract data and other information transmitted over the communication channel 310. In one example, the differential input signal 312 is applied to gate inputs or other control inputs of a pair of input transistors in the equalizer 304 and the output of the equalizer 304 is provided to the VGA 306. The gain of the VGA 306 is configurable through a gain control input 314. In one example, the gain control input 314 may include a 4-bit binary value that selects a gain setting from among 16 possible settings.

In the receiver 302, the VGA 306 cooperates with the equalizer 304 to equalize and amplify a small differential input signal 312 to a level that can be processed by a next stage. Ideally, the frequency response 320 of the equalizer 304 and the frequency response 322 of the VGA 306 produce an ideal combined frequency response 324 for each gain setting of the VGA 306. In the ideal situation the responses are substantially parallel for multiple gain settings in the combined frequency response 324. Parallel responses are indicative of consistent frequency response regardless of gain setting. A consistent equalization frequency response is typically desired regardless of the gain configured for the VGA 306. For example, the same equalization frequency response is typically desired for low amplitude signals and high amplitude signals, including when different gain settings are configured for the two signals.

In conventional systems, maintaining parallel responses for the different VGA gain settings can be very challenging. In many conventional systems, changes in VGA gain can affect equalizer pole/zero locations at high data rates. An observed combined frequency response 326 illustrates a loss of consistency between the different VGA gain settings that is indicated by a loss of parallelism at higher frequencies. In some instances, changes in the VGA 306 can affect the location of a parasitic-related Zero in the frequency response 326, in a manner referred to herein as "Zero pull-in" 328.

Certain aspects of this disclosure can optimize performance of a sampler in a high-frequency interface that includes a SerDes circuit. The example of a DFE is used herein to facilitate description of certain aspects of this disclosure. DFEs are nonlinear equalizer that are commonly used in serial links, including in high-speed SerDes circuits to flatten channel response and limit signal distortion. In certain examples, a DFE samples a received data signal to capture a time-series of bits that can be configured to cancel inter-symbol interference (ISI) in a current bit that is attributable to previous bits received in the received data signal. A summer and sampler may be provided in the DFE.

Figure 4:
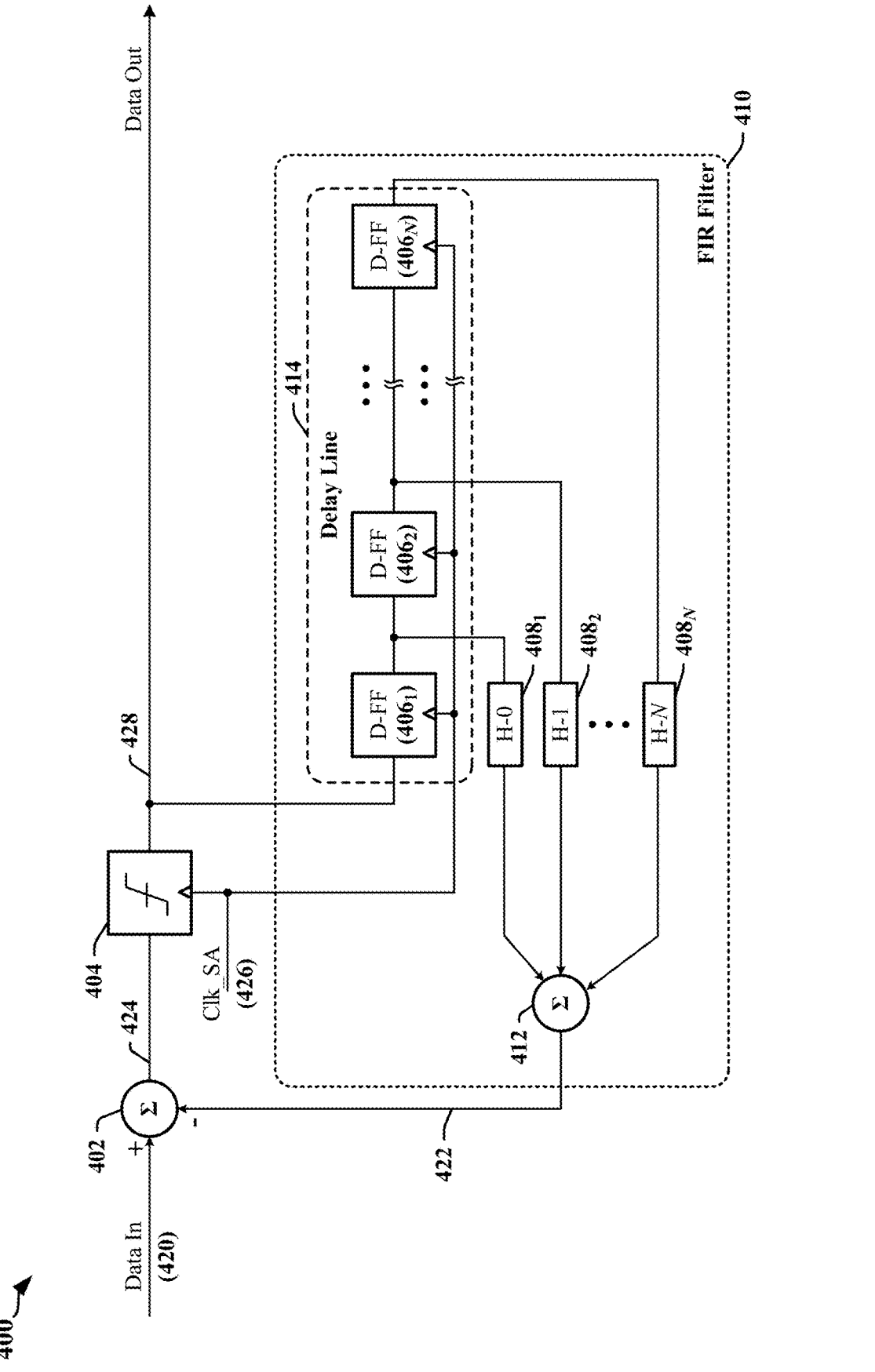
FIG. 4 illustrates a multi-tap decision-feedback equalizer that may be used in a data communication interface that can be adapted in accordance with certain aspects of this disclosure.

FIG. 4 provides an example of a conventional multi-tap DFE 400 that may be used in a data communication interface that can be adapted in accordance with certain aspects of this disclosure. For example, the presently disclosed techniques and circuits can accommodate or compensate for the effects of PVT variations on a sampler 404 and/or current summers 402, 412 provided within the DFE 400.

The current summer 402 may be configured to sum an input data signal 420 received from a communication link and a feedback signal 422 provided by a finite input response (FIR) filter 410. The output 424 of the current summer 402 is provided to a sampler 404, which may be implemented using a flipflop or latch that is clocked by a sampling clock signal (the CLK_SA signal 426), which may be derived from a clock signal corresponding to the input data signal 420. The CLK_SA signal 426 may be configured to capture data from a serial bus, for example. The sampler 404 may be referred to as a slicer that produces a sliced data signal 428 to an input to the FIR filter 410.

The illustrated FIR filter 410 includes a delay line 414 that can maintain the signaling state of the input data signal 420 in a number of previous transmission intervals. In one example, signaling state may be represented by a binary bit. In other examples, signaling state may be represented by a multibit binary number. In some examples, signaling state of a multibit input signal may be represented by a symbol. The output of the sampler 404 represents the current symbol value or signaling state of the channel in the current transmission interval. The current transmission interval may be referred to as the cursor. Outputs of the delay line 414 maintain representations of symbol value or signaling state of the channel in one or more post-cursor transmission intervals and may be used to cancel reflections and other post-cursor ISI affecting the channel in the current transmission interval. Weighted versions of the outputs of the delay line 414 may be used to subtract post-cursor ISI from the input data signal 420.

In the illustrated example, the sliced data signal 428 is used to drive the delay line 414. The delay line includes a number (N) of D-flipflops (D-FFs $406_1$-$406_N$) clocked by the CLK_SA signal 426. Weight values can be applied to the outputs of the D-FFs $406_1$-$406_N$. In the illustrated example, configurable weighted tap coefficients $408_0$-$408_N$ are applied to the outputs of the D-FFs $406_1$-$406_N$ in a feedback path that includes a current summer 412 that adds the weighted prior decisions to produce the feedback signal 422. In some implementations, current summer 402 may be used to sum the input data signal 420 and the weighted prior decisions.

In the illustrated example, the feedback signal 422 provides negative feedback. Magnitudes and polarities of the weighted tap coefficients $408_0$-$408_N$ can be configured, calibrated or adjusted to compensate for channel characteristics. The multi-tap DFE 400 can be configured to cancel ISI attributable to previous bits received in the input data signal 420, enabling later-received bits to be sampled or detected by the sampler 404 with reduced bit error rate (BER). In some instances, the weighted tap coefficients $408_0$-$408_N$ can be preconfigured by a designer or application. A controller may determine the value of the weights based on preconfigured information or information obtained from calibration or training. In some instances, the configuration, calibration, training or adjustment of the weighted tap coefficients $408_0$-$408_N$ can be performed using an adaptive algorithm. In some implementations, the weighted tap coefficients $408_0$-$408_N$ are applied to control current levels using a current digital-to-analog converter (IDAC) and/or a bias control circuit. The multi-tap DFE 400 is presented solely for the purpose of providing one example of the use of summers and samplers. Other types of circuit may include summers and samplers to perform functions other than DFE-related functions.

Figure 5:
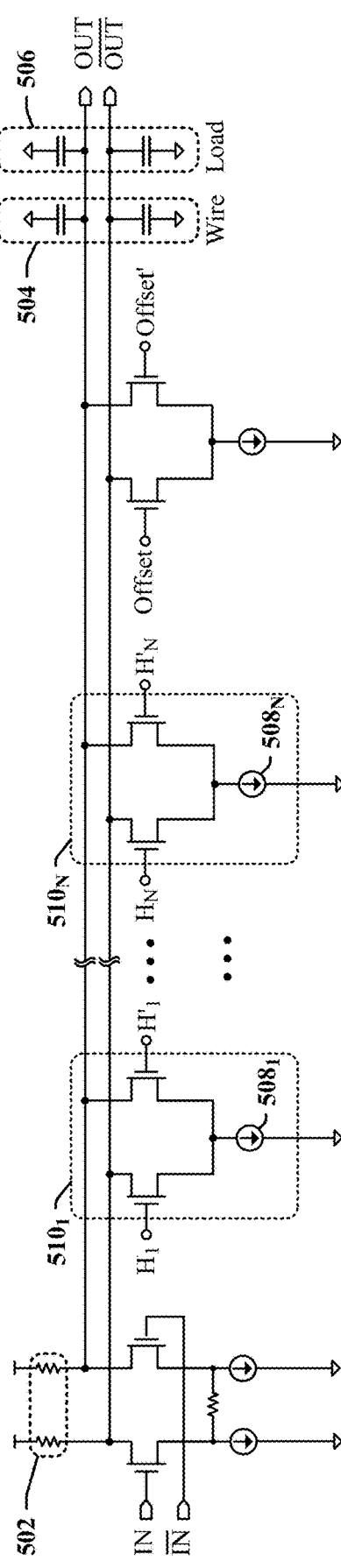
FIG. 5 illustrates an example of a current summer that may be used in a conventional multi-tap decision-feedback equalizer.

FIG. 5 illustrates an example of a current summer 500 that may be used in a conventional DFE. The current summer 500 is a resistive-load summer in which the summed current combined with an offset current (collectively, "I") flows through a load provided by resistances 502. The resistances may be implemented using suitably biased transistors. The resistance (R) provided by the resistances 502, combined with wire capacitances 504 and load capacitances 506 (collectively, "C"), can impact the settling time of transitions in data signals due to the resultant RC time constant. The resistive value of the resistances 502 can determine the swing time of the output of the resistive-load summer 500. The resistive-load summer 500 includes current sources $508_1$-$508_N$ that provide DC bias current for each of the N taps $510_1$-$510_N$. The current provided by each of the N taps $510_1$-$510_N$ is configured by corresponding differential weighting signals, including the differential pair $H_1$ and $H'_1$ in the weighting signal provided to the first tap $510_1$ and the differential pair $H_N$ and $H'_N$ in the weighting signal provided to the Ni tap $510_N$.

Certain aspects of this disclosure relate to decoding signals that are encoded using pulse amplitude modulation (PAM). A PAM signal switches between multiple predefined voltage levels. For example, FIG. 6 includes an eye diagram 600 that illustrates an example of PAM-3 signaling. In this example, a signal can switch between a high voltage level 606a, a low voltage level 606b and a middle voltage level 606c. The amplitudes of the voltage levels 606a, 606b, 606c may be defined by specifications for a communication interface. A PAM encoder can map data to one of the voltage levels 606a, 606b, 606c in each data transmission interval, which may be referred to as a unit interval (the UI 610). In one example, data encoded as a ternary (base 3) number can be transmitted in each UI 610. In other examples, multibit binary numbers can be transmitted using combinations of multiple UIs 610.

A receiving device can decode data from a PAM-3 signal using reference or threshold voltages (e.g., $V_{Thresh\_H}$ 608a and $V_{Thresh\_L}$ 608b). The voltage state of the PAM-3 signal may be sampled or captured at or near the center of each UI 610. In some implementations, capture of signaling state may occur near the end of each UI 610. The sampling or capture point may be selected to avoid periods of uncertainty in signaling associated with the transition region 612 between successive UIs 610, 614. The eye diagram 600 shows all possible signaling states over a number of UIs 610, 614, 616 in which signaling state changes between UIs 610, 614, 616.

Figure 6:
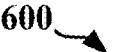
FIG. 6 illustrate certain aspects of pulse amplitude modulation decoding.
Figure 6:
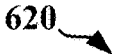
Figure 6:
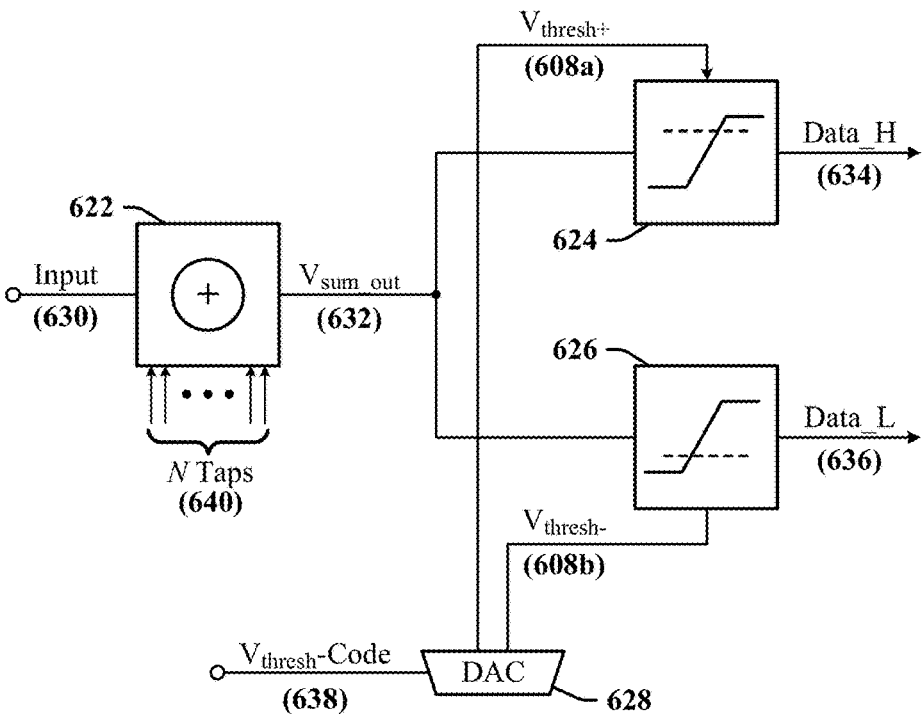

FIG. 6 also illustrates certain aspects of an interface circuit 620 in a receiving device that is configured to receive and decode a PAM-3 input signal 630. The interface circuit 620 includes or is configured to operate as a multi-tap DFE that includes two slicers 624, 626. A first slicer 624 is configured to detect and capture signaling state within a high voltage range defined or bounded by the high voltage level 606a and the middle voltage level 606c. The high voltage range corresponds to the upper eye region 602 of the eye diagram 600. A second slicer 626 is configured to detect and capture signaling state within a low voltage range defined or bounded by the middle voltage level 606c and the low voltage level 606b. The low voltage range corresponds to the lower eye region 604 of the eye diagram 600. In this example, only the middle voltage level 606c is used to define the limits of the low voltage range and the high voltage range.

The interface circuit 620 includes a current summer 622 that provides an output representative of a sum of a current representative of signaling state of the PAM-3 input signal 630 in a present transmission interval (the cursor) and currents representative of weighted contributions of signaling states captured in previous (post-cursor) transmission intervals. The post-cursor contributions are represented as the N Taps 640. The output of the current summer 622 is provided to the slicers 624, 626. Each of the slicers 624, 626 compares the output ($V_{sum\_out}$ 632) of the current summer 622 to their respective threshold voltages ($V_{Thresh\_H}$ 608a and $V_{Thresh\_L}$ 608b) in order to obtain a PAM decision that controls their corresponding outputs (Data_H 634 and Data_L 636). Combinational logic may be used to determine a combined decision (High, Middle or Low) based on the state of Data_H 634 and Data_L 636.

In conventional systems, $V_{Thresh\_H}$ 608a and $V_{Thresh\_L}$ 608b are generated by digital-to analog converter (the DAC 628). In some implementations, each of $V_{Thresh\_H}$ 608a and $V_{Thresh\_L}$ 608b is generated based on the configuration of certain bits in a multibit binary code ($V_{Thresh}$-Code 638) used to configure the DAC 628. The value of $V_{Thresh}$-Code 638 may be defined by bits of an external register, such as a configuration and status register (CSR). The CSR may be configured during system initialization and/or calibration and variations in operating data rate, PVT and other conditions may require recalibration to maintain optimized operation. Optimized operation may relate to limits on sensitivity and delays specified for the sampler.

Thresholds configured using the DAC 628 may be unable to provide consistently accurate references for generating PAM decisions. The slicers 624, 626 are typically highly sensitive to changes in the common-mode (CM) voltage of its input. CM voltage and variability of CM voltage can affect sensitivity of the slicers 624, 626 and can increase or decrease delays between the input and an output of the slicers 624, 626. CM voltage can be dependent on data rate through the slicers 624, 626. For example, in some implementations the slicers 624, 626 may be expected to operate at data rates that range between 2.5 gigabits per second (Gbps) and 32 Gbps. CM voltage is also dependent of PVT corners. PVT corners may refer to operating points, parameters and/or conditions that are defined by manufacturing tolerances (process corners) and by different voltage or temperature limits defined for interface circuits.

The thresholds configured using the DAC 628 may be unable to track changes in the PAM-3 input signal 630. For example, the DAC 628 provides DC outputs while $V_{sum\_out}$ 632 toggles and the output of the DAC 628 may not maintain correspondence with the gain of the current summer 622, which can be dependent on data rates. Additionally, the current summer 622 generates $V_{sum\_out}$ 632 from multiple inputs with variable weightings. For these and other reasons, the step size of the DAC 628 may not correspond to the gain of the current summer 622. For example, a 1 millivolt (mV) difference in PAM-3 input signal 630 does not necessarily correspond to a 1 mV change in $V_{Thresh\_H}$ 608a or $V_{Thresh\_L}$ 608b.

Figure 7:
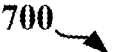
FIG. 7 illustrates an example of a slicing circuit that may be adapted or configured in accordance with certain aspects of this disclosure.
Figure 7:
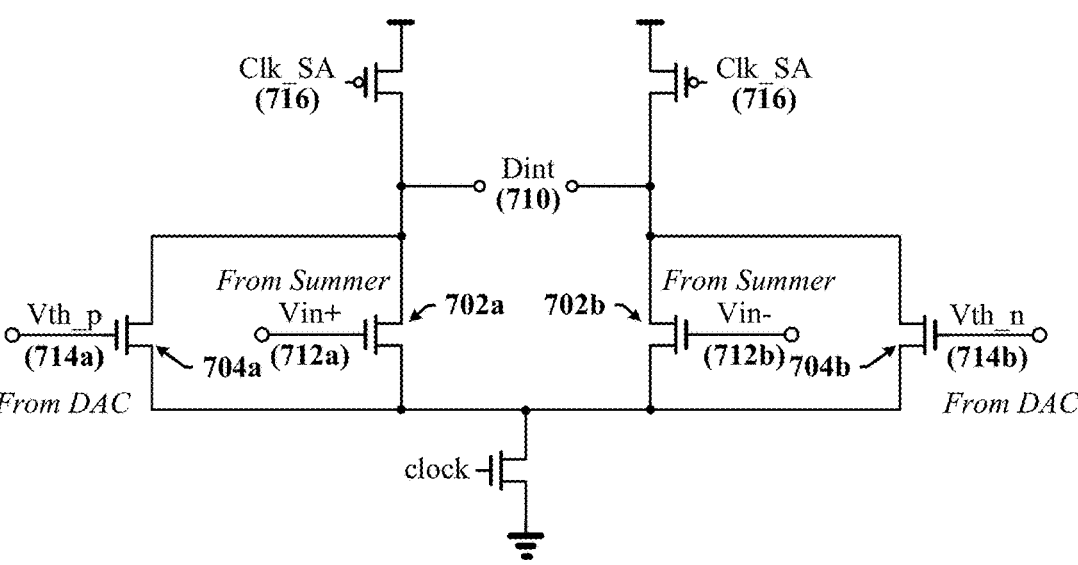
Figure 7:
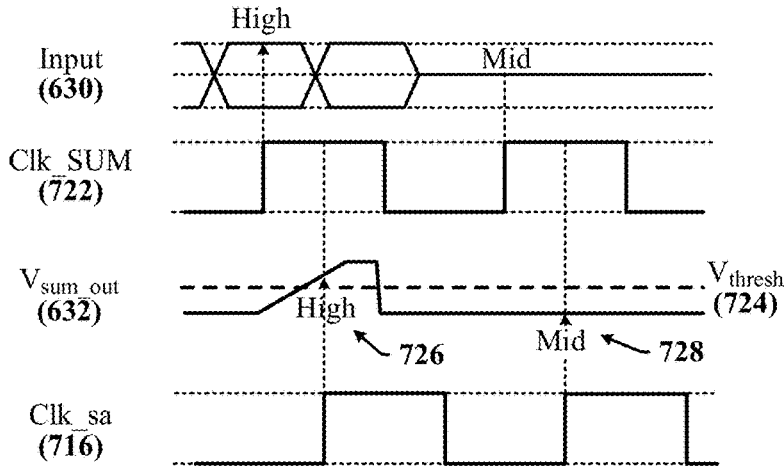

FIG. 7 illustrates an example of a slicing circuit 700 that may be adapted or configured in accordance with certain aspects of this disclosure. In one example, the slicing circuit 700 may be used to implement the slicers 624, 626 illustrated in FIG. 6. The illustrated slicing circuit 700 is enabled when Clk_SA 716 transitions to the high signaling state. The gates of input transistors 702a, 702b receive a differential input signal provided by a summing circuit. The input transistors 702a, 702b drive a differential output (Dint 710). In one example, the differential input signal may correspond to $V_{sum\_out}$ 632, which is output by the current summer 622 illustrated in FIG. 6. The gate of a first input transistor 702a is coupled to a $V_{in+}$ signal 712a and the gate of a second input transistor 702b is coupled to the complementary $V_{in-}$ signal 712b.

In the illustrated example, a pair of reference transistors 704a, 704b coupled in parallel with the input transistors 702a, 702b applies the threshold voltage that enables the slicing circuit 700 to determine the signaling state of the differential input signal. The gates of reference transistors 704a, 704b receive a differential threshold signal. The gate of a first reference transistor 704a is coupled to a $V_{th+}$ signal 714a and the gate of a second reference transistor 704b is coupled to the complementary $V_{th-}$ signal 714b. In one example, the differential threshold signal may be provided by the DAC 628 illustrated in FIG. 6. The drain of a first reference transistor 704a is coupled in parallel with the drain of the first input transistor 702a such that the first reference transistor 704a determines the gate voltage at which the first input transistor 702a switches between on and off states. The drain of a second reference transistor 704b is coupled in parallel with the drain of the second input transistor 702b such that the second reference transistor 704b determines the gate voltage at which the second input transistor 702b switches between on and off states.

The timing diagram 720 in FIG. 7 illustrates certain aspects of the operation of the slicing circuit 700. The current summer 622 illustrated in FIG. 6 is enabled by a summing clock signal 722. The output ($V_{sum\_out}$ 632) begins to rise based on the signaling state of the PAM-3 input signal 630 when the current summer 622 is enabled. The slicing circuit 700 is enabled by the Clk_SA 716 and generates a decision 726, 728 based on whether $V_{sum\_out}$ 632 is greater or less than the threshold voltage level ($V_{thresh}$ 724). In the illustrated example, the slicing circuit 700 corresponds to slicer 624 that produces the Data_H 634 decision.

Certain aspects of this disclosure relate to circuits and techniques that can be used to improve slicer reliability and/or performance by providing dynamically generated threshold voltages that are substantially unaffected by changes in CM voltage in an input signal. In one aspect, replica current summers can be used to generate threshold or reference voltages based on the input signal. The CM voltage affects the replica current summers and the primary current summer equally, thereby enabling the threshold or reference voltages to track changes in the CM voltage. A simplified current summer replica can match input common mode at the slicers. That is, the common mode voltage at the inputs to the slicers is propagated to the threshold or reference voltages used by the slicers in generating a PAM decision.

Figure 8:
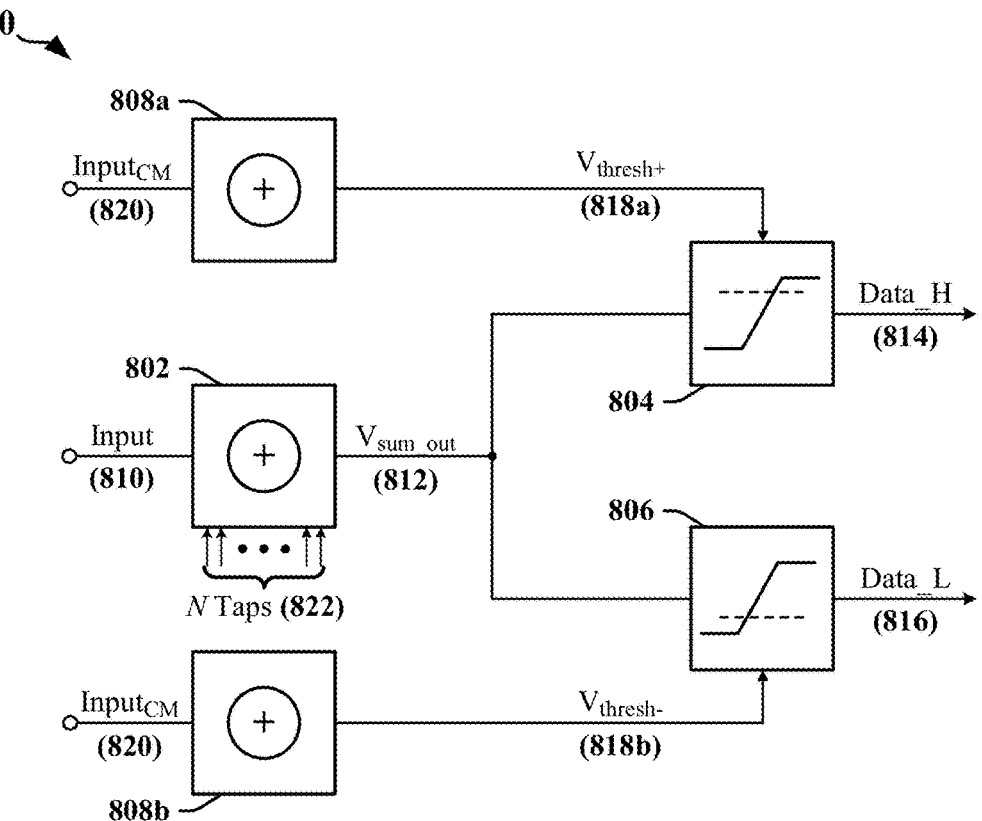
FIG. 8 illustrates an example of an interface circuit that has been adapted or configured in accordance with certain aspects of this disclosure.
Figure 8:
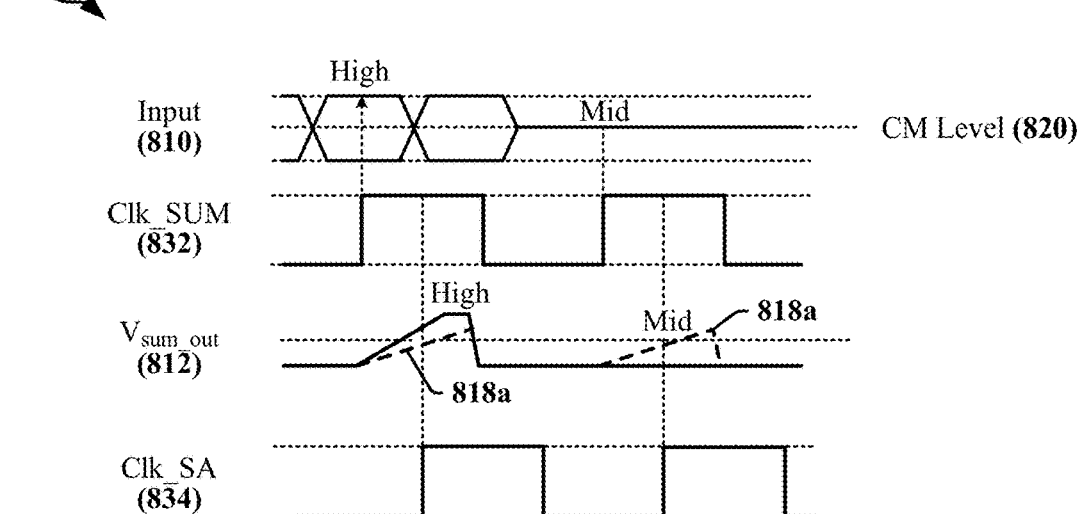

FIG. 8 illustrates an example of an interface circuit 800 in a receiving device that has been adapted or configured in accordance with certain aspects of this disclosure. In the illustrated example, the interface circuit 800 is configured to receive and decode a PAM-3 input signal 810. The interface circuit 800 includes or is configured to operate as a multi-tap DFE that includes two slicers 804, 806. A first slicer 804 is configured to detect and capture signaling state within a high voltage range defined or bounded by the high voltage level 806a and the middle voltage level 806c. A second slicer 806 is configured to detect and capture signaling state within a low voltage range defined or bounded by the middle voltage level 806c and the low voltage level 806b.

The interface circuit 800 includes a primary current summer 802 that provides an output representative of a sum of a current representative of signaling state of the PAM-3 input signal 810 in the present transmission interval (the cursor) and currents representative of weighted contributions of signaling states captured in previous (post-cursor) transmission intervals. The post-cursor contributions are represented as the N Taps 822. The output of the primary current summer 802 is provided to the slicers 804, 806. Each of the slicers 804, 806 compares the output ($V_{sum\_out}$ 812) of the current summer 802 to their respective threshold voltages ($V_{Thresh\_H}$ 818a and $V_{Thresh\_L}$ 818b) in order to obtain a PAM decision that controls their corresponding outputs (Data_H 814 and Data_L 816). Combinational logic may be used to determine a combined decision (High, Middle or Low) based on the state of Data_H 814 and Data_L 816.

The interface circuit 800 includes a reference voltage generator that can produce one or more reference voltages that can be provided to the slicers 804, 806 as threshold voltages. In the illustrated example, the reference voltage generator comprises a pair of replica summing circuits 808a, 808b. In certain implementations, the replica summing circuits 808a, 808b are configured to generate $V_{Thresh\_H}$ 818a and $V_{Thresh\_L}$ 818b. Each of the replica summing circuits 808a, 808b is effectively a replica of the primary current summer 802. In certain implementations, the replica summing circuits 808a, 808b do not include copies of all of the subcircuits in the primary current summer 802. For example, the replica summing circuits 808a, 808b may not include subcircuits that receive the weighted contributions representing post-cursor transmission intervals (the N Taps 822).

Figure 9:
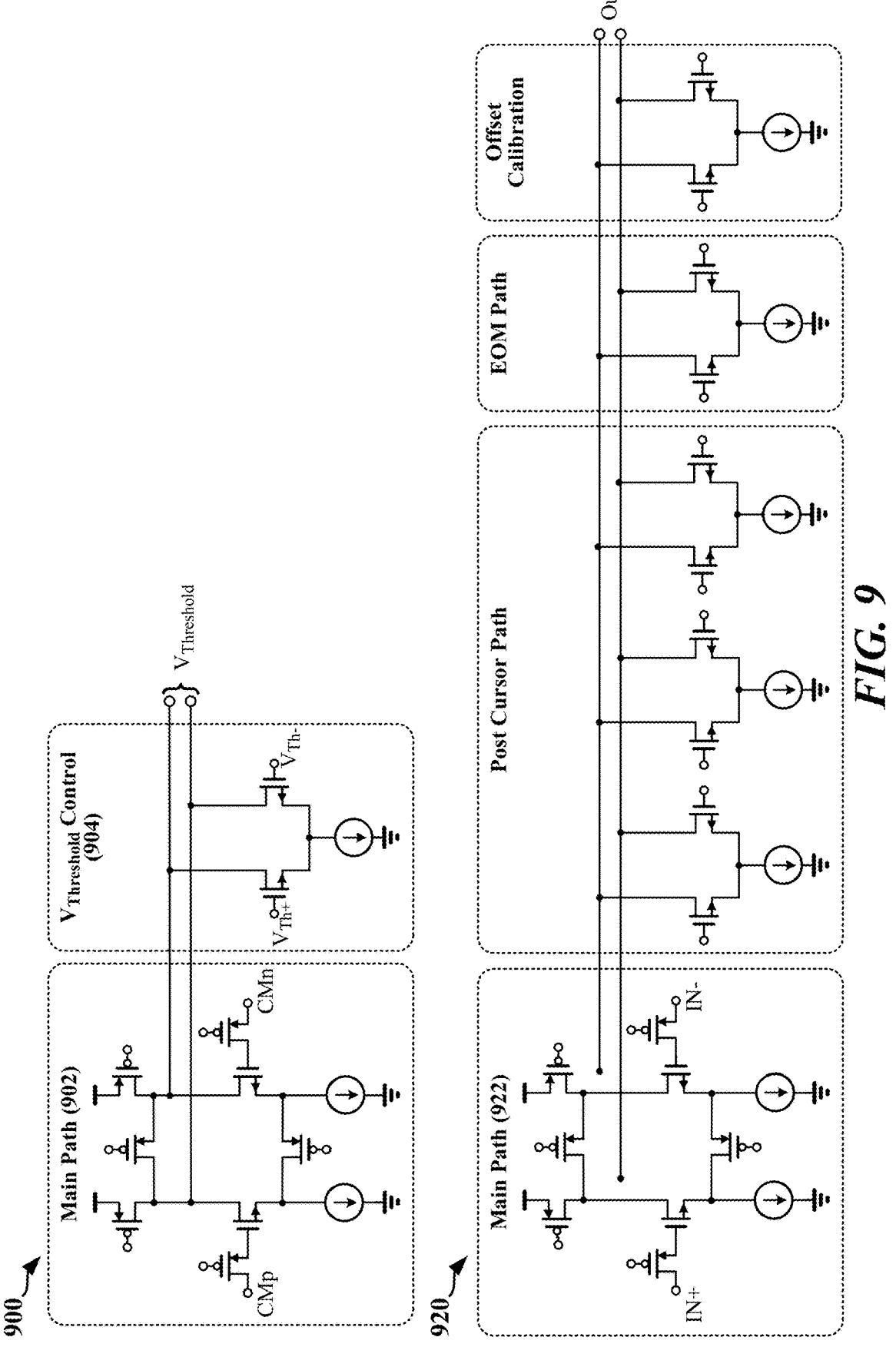
FIG. 9 illustrates certain aspects of a summer and replica summing circuit that has been configured in accordance with certain aspects of this disclosure.

FIG. 9 provides a comparison between a replica summing circuit 900 configured according to certain aspects of this disclosure and a current summer 920 that provides an output representative of a sum a current representative of signaling state of the PAM-3 input signal 810 in a present transmission interval (the cursor) and currents representative of weighted contributions of signaling states captured in previous (post-cursor) transmission intervals (the N Taps 822). The replica summing circuit 900 includes a main path subcircuit 902 that corresponds to the main path subcircuit 922 in the current summer 920. The main path subcircuit 902 in the replica summing circuit 900 is used to sum a current representative of the CM voltage with a current representative of a threshold voltage received by a threshold control subcircuit 904.

Referring again to FIG. 8, each of the replica summing circuits 808a, 808b receives an input 820 that reflects the CM voltage level of the PAM-3 input signal 810. When enabled, the outputs of the replica summing circuits 808a, 808b begin to change due to the summing operation. The voltage that the outputs of each replica summing circuit 808a, 808b may be defined by, or expressed as an integral of the current flowing in the replica summing circuit 808a, 808b over a period of time. In one example, the period of time may correspond to a fraction of the period of a summing clock signal (the Clk_SUM signal 832). The outputs of the replica summing circuits 808a, 808b are provided to respective slicers 804, 806 as threshold or reference voltages ($V_{thresh+}$ 818a and $V_{thresh-}$ 818b). The common mode voltage of $V_{thresh+}$818a and $V_{thresh-}$ 818b track the voltage of the input 820 provided to the replica summing circuits 808a, 808b, which corresponds to the CM voltage level of the PAM-3 input signal 810. In some implementations, the common mode voltage of $V_{thresh+}$818a and $V_{thresh-}$ 818b equals the voltage of the input 820 provided to the replica summing circuits 808a, 808b in a nominal or optimal mode of operation.

The timing diagram 830 in FIG. 8 illustrates certain aspects of the operation of the interface circuit 800. The replica summing circuit 808a is enabled by the Clk_SUM signal 832. The output ($V_{thresh+}$818a) of replica summing circuit 808a, for example, begins to rise based on the CM voltage level of the PAM-3 input signal 810 when the replica summing circuit 808a is enabled. The first slicer 804 is enabled by a sampling clock signal (the Clk_SA signal 834) and generates a decision based on whether $V_{sum\_out}$ 812 is greater or less than the threshold voltage level ($V_{thresh+}$ 818a). The illustrated example relates to the replica summing circuit 808a and the first slicer 804, which produces the Data_H 814 decision, but corresponds in certain respects to the replica summing circuit 808b and the slicer 806 that produces the Data_L 816 decision.

According to certain aspects of this disclosure, control of threshold or $V_{thresh+}$ 818a and $V_{thresh-}$ 818b reference voltages is based on CM voltage of the PAM-3 input signal 810, enabling reliable decisions to be produced regardless of PVT variances, data rate, or changes in data rate. The step size assigned to each threshold or reference voltage can be defined based on the gain of the primary current summer 802.

Examples of Processing Circuits and Methods

Figure 10:
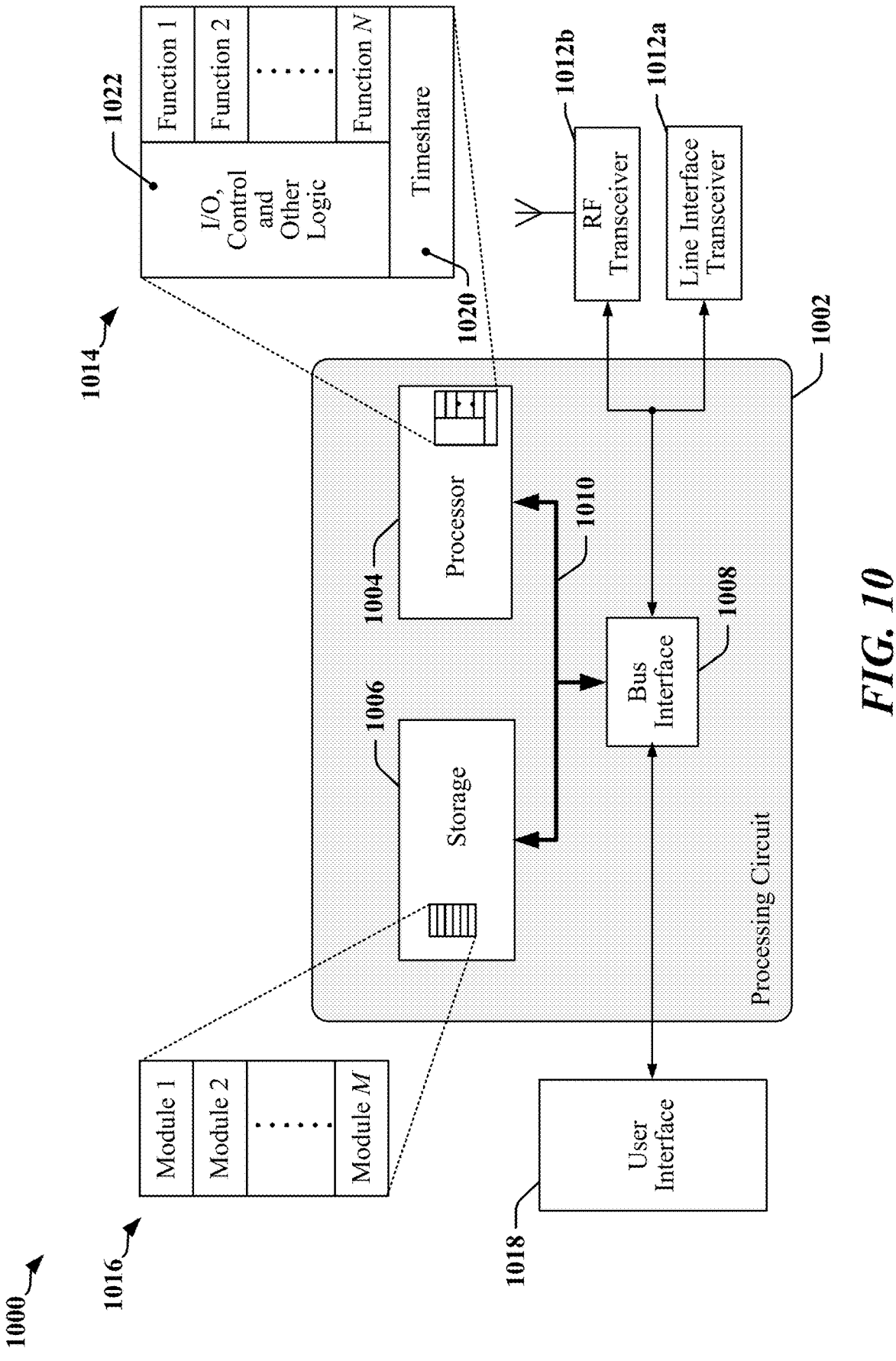
FIG. 10 illustrates one example of an apparatus employing a processing circuit that may be adapted according to certain aspects disclosed herein.

FIG. 10 is a diagram illustrating an example of a hardware implementation for an apparatus 1000. In some examples, the apparatus 1000 may perform one or more functions disclosed herein. In accordance with various aspects of the disclosure, an element, or any portion of an element, or any combination of elements as disclosed herein may be implemented using a processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012a, 1012b. A transceiver 1012a, 1012b may be provided for each networking technology supported by the processing circuit. In some instances, multiple networking technologies may share some or all of the circuitry or processing modules found in a transceiver 1012a, 1012b. Each transceiver 1012a, 1012b provides a means for communicating with various other apparatus over a transmission medium. In one example, a transceiver 1012a may be used to couple the apparatus 1000 to a multi-wire bus. In another example, a transceiver 1012b may be used to connect the apparatus 1000 to a radio access network. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement certain methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as a transceiver 1012a, 1012b, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to a transceiver 1012a, 1012b, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012a, 1012b, and device drivers, for example. To support the performance of multiple functions, the one or more processors 1004 may be configured to provide a multitasking environment, whereby each of a plurality of functions is implemented as a set of tasks in a corresponding context that is serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit operates in a corresponding context and is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

In one example, the processing circuit 1002 may be used to implement an interface circuit in a receiving device. The interface circuit may include a current summer, a pair of slicers and a pair of replica summing circuits. The current summer may be configured to sum a current representative of a signaling state of an input signal in a present transmission interval with currents representative of signaling states of the input signal captured in previous transmission intervals. A first slicer may be configured to generate a first decision based on a comparison of an output of the current summer and voltage level of a first threshold signal. A second slicer may be configured to generate a second decision based on a comparison of the output of the current summer and voltage level of a second threshold signal. A first replica summing circuit may be configured to generate the first threshold signal based on a common-mode signal that is representative of the common-mode voltage at the input of the current summer. A second replica summing circuit may be configured to generate the second threshold signal based on the common mode signal.

In certain implementations, the input signal is a PAM signal. The first threshold signal may have a voltage that lies within a first range of voltages bounded by a first pair of signaling levels associated with the PAM signal. The second threshold signal may have a voltage that lies within a second range of voltages bounded by a second pair of signaling levels associated with the PAM signal. In some instances, at least one signaling level in the first pair of signaling levels is different from both signaling levels in the second pair of signaling levels. In the example of a PAM-3 encoded input signal, the first range of voltages corresponds to the upper eye region 602 of the eye diagram 600 illustrated in FIG. 6 and is bounded by the high voltage level 606a and the middle voltage level 606c, and the second range of voltages corresponds to the lower eye region 604 of the eye diagram 600 and is bounded by the middle voltage level 606c and the low voltage level 606b.

In some examples, the currents representative of signaling states of the input signal captured in previous transmission intervals are weighted using decision-feedback equalizer taps. In some implementations, the first threshold signal has a voltage level that is defined by an integral of the current flow over a period of time. The second threshold signal may have a voltage level that is defined by an integral of the current flow over a period of time.

A reference voltage generation circuit provided in accordance with certain aspects of this disclosure include first and second replica summing circuits that are at least partial replicas of a current summer. The first replica summing circuit may be configured to output a first threshold signal based on a common-mode voltage at an input of the current summer. The second replica may be configured to output a second threshold signal based on the common-mode voltage at the input of the current summer. The first threshold signal may be provided to a first slicer that is configured to generate a first decision regarding signaling state of an input signal received by the summer based on voltage level of the first threshold signal. The second threshold signal may be provided to a second slicer that is configured to generate a second decision regarding signaling state of an input signal received by the summer based on voltage level of the second threshold signal.

The current summer may be configured to sum currents provided by a plurality of current sources. The currents may include a first current representative of a signaling state of an input signal in a first transmission interval and one or more weighted currents representative of signaling states of the input signal captured in corresponding transmission intervals that precede the first transmission interval. The weights used to provide the one or more weighted currents may be configured by or for a DFE. The first replica summing circuit and the first replica summing circuit may be configured to sum unweighted currents. The first decision and the second decision may relate to signaling state of a PAM signal. The voltage level of the first threshold signal may be different from the voltage level of the second threshold signal.

Figure 11:
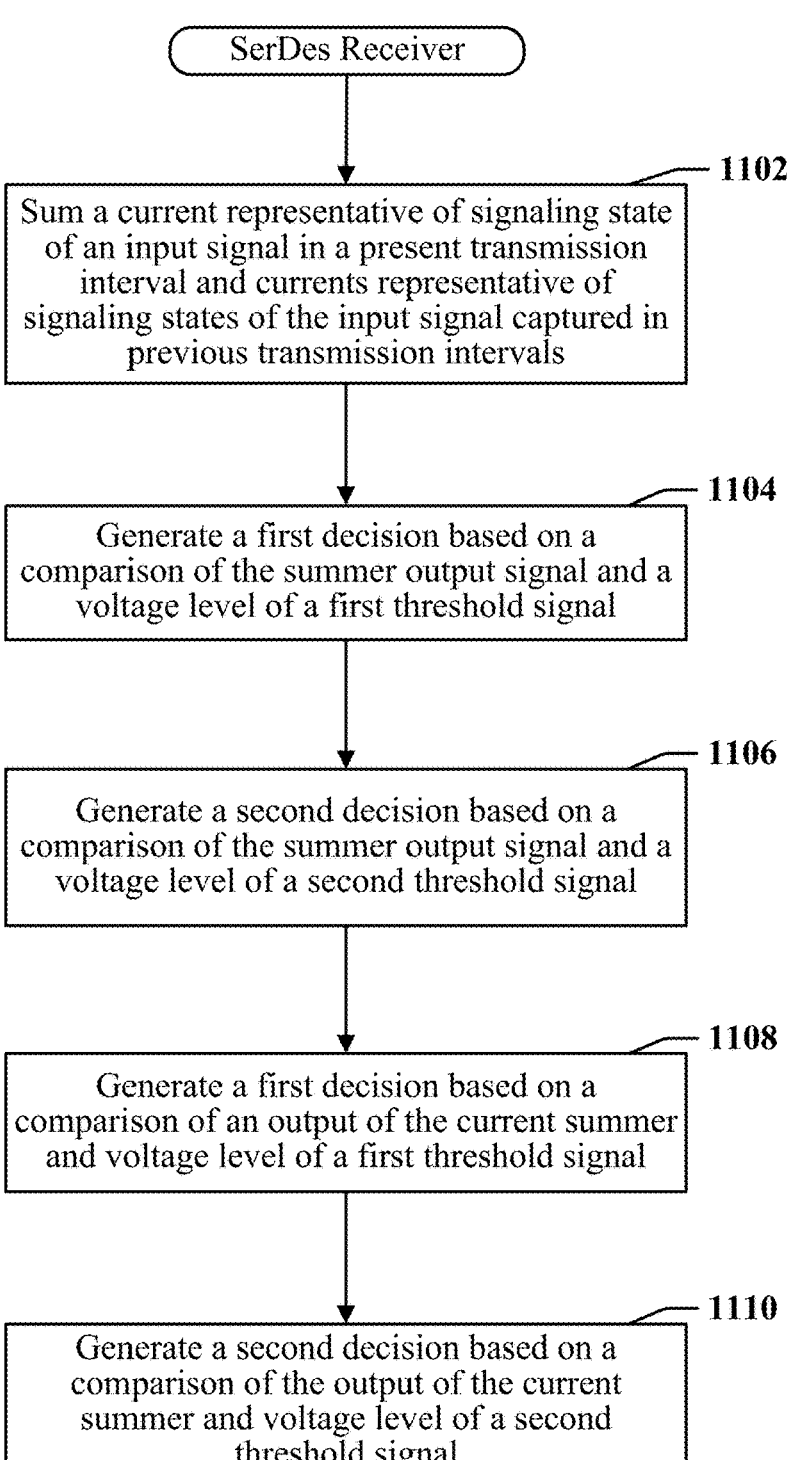
FIG. 11 is a flow diagram illustrating an example of a method for c for receiving encoded signals in a high speed SerDes interface according to certain aspects disclosed herein.

FIG. 11 is a flow diagram illustrating an example of a method 1100 for receiving encoded signals in a high speed SerDes interface. In one example, the method 1100 may be performed at the interface circuit 800 illustrated in FIG. 8. For example, the method 1100 may be performed in a receiver that includes a multi-tap DFE, two slicers a summer and two replica summing circuits.

At block 1102, a current representative of a signaling state of an input signal in a present transmission interval may be summed with currents representative of signaling states of the input signal captured in previous transmission intervals. At block 1104, a first decision may be generated based on a comparison of the summer output signal and a voltage level of a first threshold signal. At block 1106, a second decision may be generated based on a comparison of the summer output signal and a voltage level of a second threshold signal.

At block 1108, the first threshold signal may be generated based on a common-mode signal that is representative of the common-mode voltage of the input signal. At block 1110, the second threshold signal may be generated based on the common-mode signal.

In certain implementations, the input signal is a PAM signal. The first threshold signal may have a voltage that lies within a first range of voltages bounded by a first pair of signaling levels associated with the PAM signal. The second threshold signal may have a voltage that lies within a second range of voltages bounded by a second pair of signaling levels associated with the PAM signal. In some instances, at least one signaling level in the first pair of signaling levels is different from both signaling levels in the second pair of signaling levels. In the example of a PAM-3 encoded input signal, the first range of voltages corresponds to the upper eye region 602 of the eye diagram 600 illustrated in FIG. 6 and is bounded by the high voltage level 606a and the middle voltage level 606c, and the second range of voltages corresponds to the lower eye region 604 of the eye diagram 600 and is bounded by the middle voltage level 606c and the low voltage level 606b.

In some examples, the currents representative of signaling states of the input signal captured in previous transmission intervals are weighted using decision-feedback equalizer taps. In some implementations, the first threshold signal has a voltage level that is defined by an integral of the current flow over a period of time. The second threshold signal may have a voltage level that is defined by an integral of the current flow over a period of time.

The operational steps described in any of the exemplary aspects herein are described to provide a subset of examples of possible implementations. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

In certain aspects, an apparatus includes means for summing currents representative of a sequence of signaling states of an input signal and to obtain a summer output signal, means for generating decisions related to the summer output signal, and means for generating threshold signals.

The means for generating decisions related to the summer output signal may include a first slicer configured to generate a first decision based on a comparison of a summer output signal and voltage level of a first threshold signal, and a second slicer configured to generate a second decision based on a comparison of the summer output signal and voltage level of a second threshold signal. The means for generating threshold signals may generate the first threshold signal and the second threshold signal based on a common-mode signal that is representative of the common-mode voltage at the input of the current summer.

In certain implementations, the input signal is a PAM signal. The first threshold signal may have a voltage that lies within a first range of voltages bounded by a first pair of signaling levels associated with the PAM signal. The second threshold signal may have a voltage that lies within a second range of voltages bounded by a second pair of signaling levels associated with the PAM signal. In some instances, at least one signaling level in the first pair of signaling levels is different from both signaling levels in the second pair of signaling levels. In the example of a PAM-3 encoded input signal, the first range of voltages corresponds to the upper eye region 602 of the eye diagram 600 illustrated in FIG. 6 and is bounded by the high voltage level 606a and the middle voltage level 606c, and the second range of voltages corresponds to the lower eye region 604 of the eye diagram 600 and is bounded by the middle voltage level 606c and the low voltage level 606b.

In some examples, the currents representative of signaling states of the input signal captured in previous transmission intervals are weighted using decision-feedback equalizer taps. In some implementations, the first threshold signal has a voltage level that is defined by an integral of the current flow over a period of time. The second threshold signal may have a voltage level that is defined by an integral of the current flow over a period of time.

Some implementation examples are described in the following numbered clauses:

1. An interface circuit in a receiving device, comprising: a current summer configured to sum a current representative of a signaling state of an input signal in a present transmission interval with currents representative of signaling states of the input signal captured in previous transmission intervals; a first slicer configured to generate a first decision based on a comparison of an output of the current summer and voltage level of a first threshold signal; a second slicer configured to generate a second decision based on a comparison of the output of the current summer and voltage level of a second threshold signal; a first replica summing circuit configured to generate the first threshold signal based on a common-mode signal that is representative of common-mode voltage at the input of the current summer; and a second replica summing circuit configured to generate the second threshold signal based on the common-mode signal.

2. The interface circuit as described in clause 1, wherein the input signal comprises a pulse amplitude modulation (PAM) signal.

3. The interface circuit as described in clause 2, wherein the first threshold signal has a voltage that lies within a first range of voltages bounded by a first pair of signaling levels associated with the PAM signal, and wherein the second threshold signal has a voltage that lies within a second range of voltages bounded by a second pair of signaling levels associated with the PAM signal.

4. The interface circuit as described in clause 3, wherein at least one signaling level in the first pair of signaling levels is different from both signaling levels in the second pair of signaling levels.

5. The interface circuit as described in any of clauses 1-4, wherein the currents representative of signaling states of the input signal captured in previous transmission intervals are weighted using decision-feedback equalizer taps.

6. The interface circuit as described in any of clauses 1-5, wherein the first threshold signal has a voltage level that is defined by an integral of current flow in the first replica summing circuit over a period of time.

7. The interface circuit as described in any of clauses 1-6, wherein the second threshold signal has a voltage level that is defined by an integral of current flow in the second replica summing circuit over a period of time.

8. An apparatus, comprising: means for summing currents representative of a sequence of signaling states of an input signal and to obtain a summer output signal; means for generating decisions related to the summer output signal, including: a first slicer configured to generate a first decision based on a comparison of an summer output signal and voltage level of a first threshold signal, and a second slicer configured to generate a second decision based on a comparison of the summer output signal and voltage level of a second threshold signal; and means for generating threshold signals based on a common-mode signal that is representative of common-mode voltage at the input of the current summer, the threshold signals including the first threshold signal and the second threshold signal.

9. The apparatus as described in clause 8, wherein the input signal comprises a pulse amplitude modulation (PAM) signal.

10. The apparatus as described in clause 9, wherein the first threshold signal has a voltage that lies within a first range of voltages bounded by a first pair of signaling levels associated with the PAM signal, and wherein the second threshold signal has a voltage that lies within a second range of voltages bounded by a second pair of signaling levels associated with the PAM signal.

11. The apparatus as described in clause 10, wherein at least one signaling level in the first pair of signaling levels is different from both signaling levels in the second pair of signaling levels.

12. The apparatus as described in any of clauses 8-11, wherein the currents representative of signaling states of the input signal captured in previous transmission intervals are weighted using decision-feedback equalizer taps.

13. The apparatus as described in any of clauses 8-12, wherein the first threshold signal has a voltage level that is defined by an integral of current flow over a period of time, and wherein the second threshold signal has a voltage level that is defined by an integral of current flow over a period of time.

14. A method for receiving encoded signals, comprising: summing a current representative of a signaling state of an input signal in a present transmission interval with currents representative of signaling states of the input signal captured in previous transmission intervals to obtain a summer output signal; generating a first decision based on a comparison of the summer output signal and a voltage level of a first threshold signal; generating a second decision based on a comparison of the summer output signal and a voltage level of a second threshold signal; generating the first threshold signal based on a common-mode signal that is representative of common-mode voltage of the input signal; and generating the second threshold signal based on the common-mode signal.

15. The method as described in clause 14, wherein the input signal comprises a pulse amplitude modulation (PAM) signal.

16. The method as described in clause 15, wherein the first threshold signal has a voltage that lies within a first range of voltages bounded by a first pair of signaling levels associated with the PAM signal, and wherein the second threshold signal has a voltage that lies within a second range of voltages bounded by a second pair of signaling levels associated with the PAM signal.

17. The method as described in clause 16, wherein at least one signaling level in the first pair of signaling levels is different from both signaling levels in the second pair of signaling levels.

18. The method as described in any of clauses 14-17, wherein the currents representative of signaling states of the input signal captured in previous transmission intervals are weighted using decision-feedback equalizer taps.

19. The method as described in any of clauses 14-18, wherein the first threshold signal has a voltage level that is defined by an integral of current flow over a period of time.

20. The method as described in any of clauses 14-19, wherein the second threshold signal has a voltage level that is defined by an integral of current flow over a period of time.

21. A reference voltage generator, comprising: a first replica summing circuit that is at least a partial replica of a current summer, the first replica summing circuit being configured to output a first threshold signal based on a common-mode voltage at an input of the current summer; and a second replica summing circuit that is at least a partial replica of the current summer, the second replica summing circuit being configured to output a second threshold signal based on the common-mode voltage at the input of the current summer, wherein: the first threshold signal is provided to a first slicer that is configured to generate a first decision regarding signaling state of an input signal received by the summer based on voltage level of the first threshold signal, and the second threshold signal is provided to a second slicer that is configured to generate a second decision regarding signaling state of an input signal received by the summer based on voltage level of the second threshold signal.

22. The reference voltage generator as described in clause 21, wherein the current summer is configured to sum currents provided by a plurality of current sources, including a first current representative of a signaling state of an input signal in a first transmission interval and one or more weighted currents representative of signaling states of the input signal captured in corresponding transmission intervals that precede the first transmission interval.

23. The reference voltage generator as described in clause 22, wherein weights used to provide the one or more weighted currents are configured for a decision-feedback equalizer (DFE).

24. The reference voltage generator as described in clause 22 or clause 23, wherein the first replica summing circuit and the first replica summing circuit are configured to sum unweighted currents.

25. The reference voltage generator as described in any of clauses 21-24, wherein the first decision and the second decision relate to signaling state of a pulse amplitude modulation (PAM) signal.

26. The reference voltage generator as described in any of clauses 21-24, wherein the voltage level of the first threshold signal is different from the voltage level of the second threshold signal.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An interface circuit in a receiving device, comprising: a current summer configured to sum a current representative of a signaling state of an input signal in a present transmission interval with currents representative of signaling states of the input signal captured in previous transmission intervals;
a first slicer configured to generate a first decision based on a comparison of an output of the current summer and a voltage level of a first threshold signal;
a second slicer configured to generate a second decision based on a comparison of the output of the current summer and a voltage level of a second threshold signal;
a first replica summing circuit configured to generate the first threshold signal based on a common-mode signal that is representative of a common-mode voltage at the input of the current summer; and
a second replica summing circuit configured to generate the second threshold signal based on the common-mode signal.

2. The interface circuit of claim 1, wherein the input signal comprises a pulse amplitude modulation (PAM) signal.

3. The interface circuit of claim 2, wherein the first threshold signal has a voltage that lies within a first range of voltages bounded by a first pair of signaling levels associated with the PAM signal, and wherein the second threshold signal has a voltage that lies within a second range of voltages bounded by a second pair of signaling levels associated with the PAM signal.

4. The interface circuit of claim 3, wherein at least one signaling level in the first pair of signaling levels is different from a first signaling level and a second signaling level of the second pair of signaling levels.

5. The interface circuit of claim 1, wherein the currents representative of signaling states of the input signal captured in the previous transmission intervals are weighted using decision-feedback equalizer taps.

6. The interface circuit of claim 1, wherein the voltage level of the first threshold signal is defined by an integral of current flow in the first replica summing circuit over a period of time.

7. The interface circuit of claim 1, wherein the voltage level of the second threshold signal is defined by an integral of current flow in the second replica summing circuit over a period of time.

8. A reference voltage generator, comprising:

a first replica summing circuit that is at least a partial replica of a current summer, the first replica summing circuit being configured to output a first threshold signal based on a common-mode voltage at an input of the current summer; and a second replica summing circuit that is at least a partial replica of the current summer, the second replica summing circuit being configured to output a second threshold signal based on the common-mode voltage at the input of the current summer, wherein:

the first threshold signal is provided to a first slicer that is configured to generate a first decision regarding a signaling state of an input signal received by the current summer based on a voltage level of the first threshold signal, and the second threshold signal is provided to a second slicer that is configured to generate a second decision regarding a signaling state of the input signal received by the current summer based on a voltage level of the second threshold signal.

9. The reference voltage generator of claim 8, wherein the current summer is configured to sum currents provided by a plurality of current sources, including a first current representative of a signaling state of the input signal in a first transmission interval and one or more weighted currents representative of signaling states of the input signal captured in corresponding transmission intervals that precede the first transmission interval.

10. The reference voltage generator of claim 9, wherein weights used to provide the one or more weighted currents are configured for a decision-feedback equalizer (DFE).

11. The reference voltage generator of claim 9, wherein the first replica summing circuit and the second replica summing circuit are configured to sum unweighted currents.

12. The reference voltage generator of claim 8, wherein the first decision and the second decision relate to a signaling state of a pulse amplitude modulation (PAM) signal.

13. The reference voltage generator of claim 8, wherein the voltage level of the first threshold signal is different from the voltage level of the second threshold signal.

14. A method for receiving signals, comprising:

summing a current representative of a signaling state of an input signal in a present transmission interval with currents representative of signaling states of the input signal captured in previous transmission intervals to obtain a summer output signal;

generating a first decision based on a comparison of the summer output signal and a voltage level of a first threshold signal;

generating a second decision based on a comparison of the summer output signal and a voltage level of a second threshold signal;

generating the first threshold signal based on a common-mode signal that is representative of a common-mode voltage of the input signal; and generating the second threshold signal based on the common-mode signal.

15. The method of claim 14, wherein the input signal comprises a pulse amplitude modulation (PAM) signal.

16. The method of claim 15, wherein the first threshold signal has a voltage that lies within a first range of voltages bounded by a first pair of signaling levels associated with the PAM signal, and wherein the second threshold signal has a voltage that lies within a second range of voltages bounded by a second pair of signaling levels associated with the PAM signal.

17. The method of claim 16, wherein at least one signaling level in the first pair of signaling levels is different from a first signaling level and a second signaling level of the second pair of signaling levels.

18. The method of claim 14, wherein the currents representative of signaling states of the input signal captured in the previous transmission intervals are weighted using decision-feedback equalizer taps.

19. The method of claim 14, wherein the voltage level of the first threshold signal is defined by an integral of current flow over a period of time.

20. The method of claim 14, wherein the voltage level of the second threshold signal is defined by an integral of current flow over a period of time.

* * * * *